May 23, 1961 P. K. TRIMBLE 2,985,833
BALANCING APPARATUS
Filed Nov. 30, 1955 2 Sheets-Sheet 1
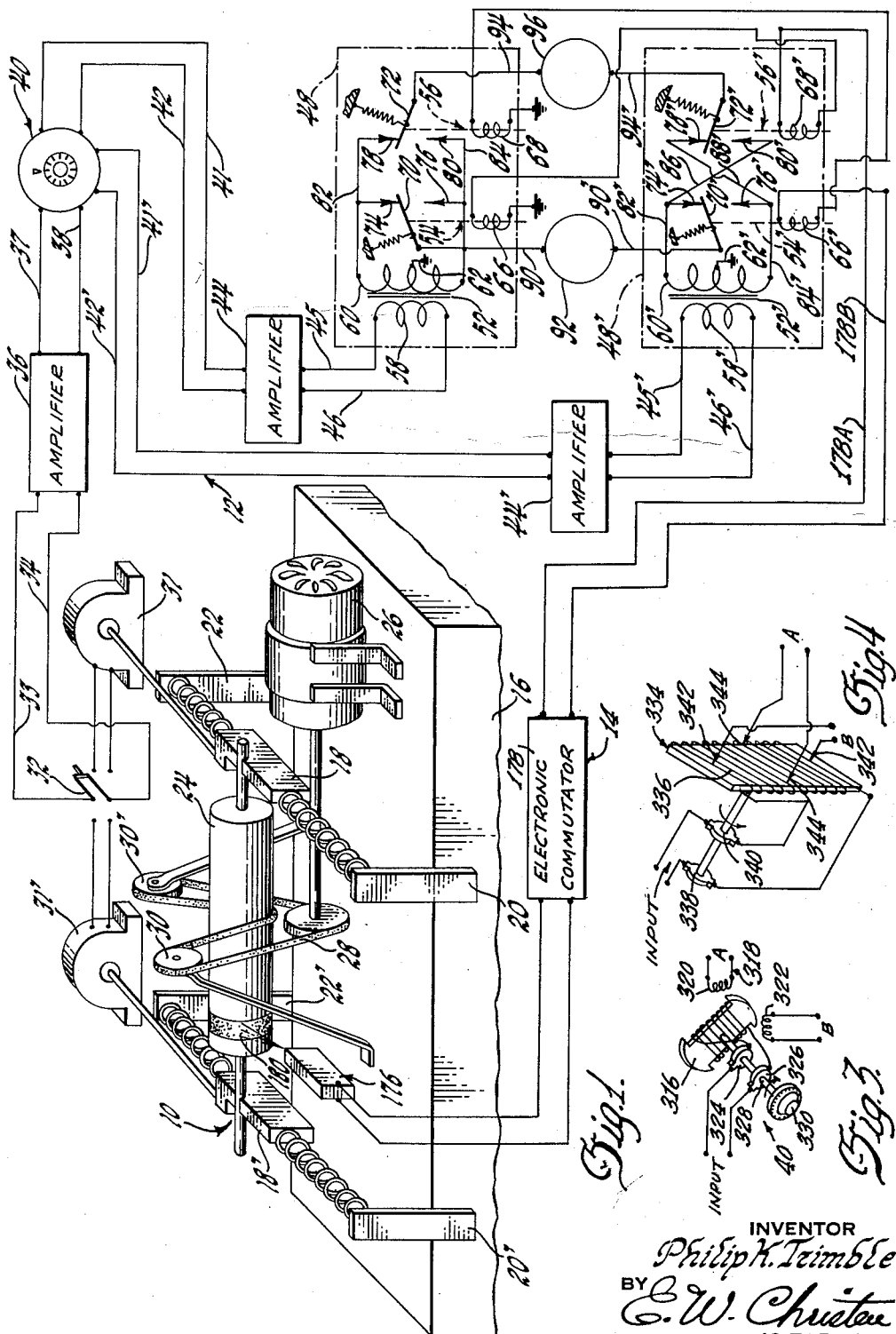
INVENTOR
*Philip K. Trimble*
BY *E. W. Christoe*
ATTORNEY

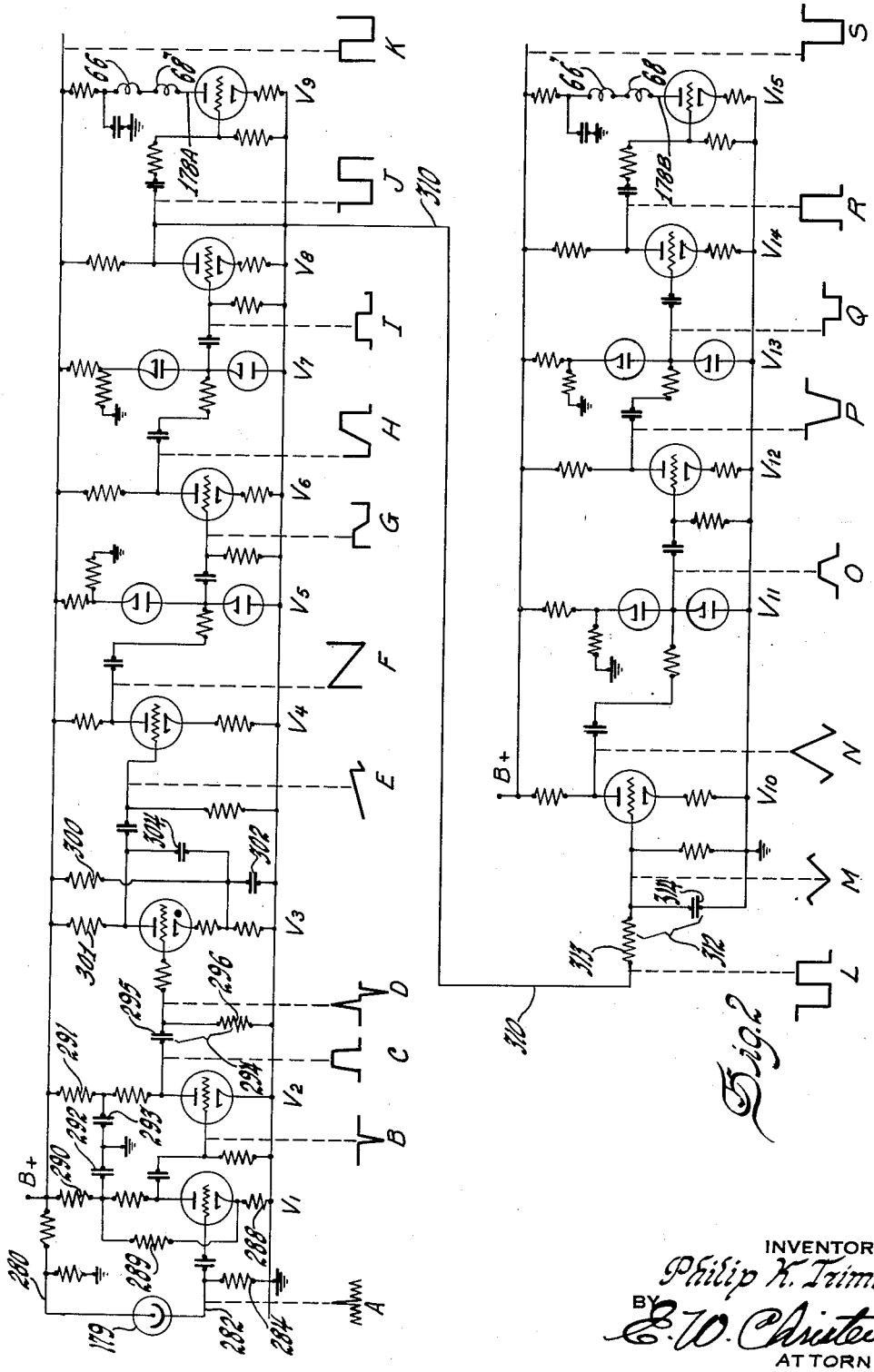

United States Patent Office 2,985,833
Patented May 23, 1961

2,985,833
BALANCING APPARATUS

Philip K. Trimble, Rochester, Mich., assignor to General Motors Corporation, Detroit, Mich., a corporation of Delaware Filed Nov. 30, 1955, Ser. No. 550,146
5 Claims. (Cl. 328—24)

This invention relates to an electronic commutator adapted to convert a periodically occurring low frequency input pulse into a pair of square waves of input signal frequency but displaced 90 degrees in time phase apart.

The invention is shown in a balancing machine using an unbalance detecting and measuring apparatus of the type described in copending U.S. application S.N. 524,253, filed July 25, 1955, and requiring a pair of square wave commutating reference signals that are displaced 90 degrees in time apart and are synchronized with the rotation of the workpiece. The invention is specially, though not exclusively, suited for use in balancing machines of the belt-driven variety, for example, in which the part being balanced does not permit of using a direct drive therefor from the drive motor nor the use of reference or communtating signal generating means connected in any manner thereto and requires that the reference wave or waves be derived by photoelectric, magnetic or capacitive pickup means and the like.

The invention has among its objects to provide a commutating apparatus for balancing machines of the above and a related character which derives a pair of square wave commutating signals displaced 90 degrees in time apart from a single synchronizing input pulse. Another object is to provide such commutating apparatus which avoids the use of frequency sensitive tuned circuit elements that otherwise would limit the operation of the balancing machine to a single speed or affect the operation of the measuring apparatus if the balancing speed should change or vary.

Still another object is to provide a commutating apparatus which develops a pair of square wave outputs, each of which has equal half periods or on and off time charcteristics to provide accurate 180 degree commutating or switching intervals over the entire range of operating speeds of the balancing machine. A related object is to provide such commutating apparatus in which the above specified 90 degree time phase relationship between the commutating waves is maintained throughout the entire range of operating speeds of the balancing machine.

The above and other objects together with the advantages and features of the present invention will appear from the following description and drawings wherein:

Fig. 1 is a schematic illustration of a belt-driven balancing installation and a measuring apparatus therefor utilizing an electronic commutator in accordance with the present invention;

Fig. 2 is a schematic electric circuit diagram of an electronic commutator used in the apparatus of Fig. 1 together with the wave shapes indicated by the curves 2A through 2S of the voltages obtained at various points therein.

Fig. 3 is a schematic view of one form of a synchro resolver.

Fig. 4 is a schematic view of another form of resolver.

Referring to the drawings, Fig. 1 illustrates a belt-driven balancing machine 10 and an unbalance detecting and measuring apparatus 12 therefor using an electronic commutator 14 in accordance with the present invention.

The balancing machine 10 includes a base portion 16 and a pair of spaced, half-bearings or journals 18, 18' which are resiliently supported between upstanding lateral supports 20, 22 and 20', 22' on opposite sides of the base 16, as shown. The workpiece 24 is mounted in the journals 18, 18' and is driven from a drive motor 26 through a friction belt 28 extending between a pair of resiliently supported pulleys 30, 30' in accordance with conventional balancing practice.

The unbalance detecting and measuring apparatus is described more fully in the above mentioned copending application and includes a pair of conventional electromagnetic pickup devices 31, 31' which engage the respective journals 18, and 18' to sense their movement to unbalance in the right hand and left hand pickup planes shown. Each of the pickups develops a substantially sinusoidal signal having a frequency corresponding to the speed of rotation of the body 24 and an amplitude corresponding to the horizontal movement of the journals 18, 18' caused by any unbalance in the right-hand and left-hand ends of the body. Each signal will also bear a phase characteristic with respect to a point on the body that will be related to the angular location of unbalance therein. The electrical output of each pickup may be supplied to a D.P.D.T. selector switch as 32 which selectively connects the output of either pickup over conductors 33, 34 to the input of the unbalance measuring apparatus.

The unbalance measuring apparatus includes an amplifier 36 whose output is connected over conductors 37, 38 to the input of a harmonic vector resolver 40 having a pair of outputs which are connected over conductors 41, 42 and 41', 42' in separate branch circuits each including an amplifier 44, 44' connected over conductors 45, 46 and 45', 46' to chopper or modulating device 48, 48', as shown.

In the interest of clarity, the construction and operation of suitable forms of harmonic vector or sine-cosine resolvers that may be employed in the present invention are treated below.

A sine-cosine resolver is an instrument type electromechanical device into which an electric signal and a mechanical angle $\phi$ can be introduced. Physically, these devices are of small dimensions and light mass and require a very small amount of mechanical torque for actuation thereof. From the resolver are obtained two electrical signals, one proportional to the product of the input signal and the sine of the mechanical angle, the other proportional to the product of the input signal and the cosine of the mechanical angle.

One common device employed for sine-cosine resolution is the synchro resolver shown schematically in Figure 3. The synchro resolver consists of a salient pole wound rotor 316 and a two phase stator 318 having its two phase windings 320, 322 mechanically oriented at 90 degrees. The rotor is energized through slip rings 324, 326 to which the input signal to be resolved is applied. The shaping of the pole pieces and the distribution of the windings is proportioned to obtain flux linkages between the rotor and the stator windings which vary sinusoidally with the angular position of the rotor. Fastened to the rotor shaft 328 is an angularly graduated adjusting knob 330 that cooperates with an index pointer 332 on the stator casing whereby the rotor 316 may be manually turned relative to the stator 318 to introduce any desired mechanical angle $\phi$ into this vector resolver 40. The resolver 40 will thus supply a component which is a function of U cosine $\phi$ to amplifier 44 and a component which is a function of U sine $\phi$ to amplifier 44' where U is the unbalance signal.

Another form of resolver is the sine-cosine potentiometer or D.C. resolver, which is shown in Figure 4. It consists of a rectangular card 334 wrapped with a continuous conductor to form a flat 336 of straight, parallel, uniformly spaced, current carrying wires. The input signal is applied to the opposite ends of the coil 336 through the slip ring connections 338, 340. Rotation of the card 334 about its midpoint causes the two sets of output contacts 342 and 344 to trace a circular path on the resistance card. The potential between each brush and the midpoint of the winding varies sinusoidally with the angle of card rotation. In the interest of economy two contacts at opposite ends of a diameter are employed rather than one for each component output and two pairs of contacts, spaced 90 degrees apart, are used to generate a sine and cosine function simultaneously from the same card.

Each of the chopper devices 48 and 48' includes a transformer 52, 52' and a pair of D.P.D.T. relays 54, 56 and 54', 56'. Each of the transformers 52 and 52' has a primary winding 58, 58' and a secondary winding 60, 60' with a grounded center tap connection 62, 62'. Relay devices 54, 56 and 54', 56' contained within the choppers 48 and 48' include an activating coil 66, 68 and 66', 68' respectively, for operating spring biased switch arms 70, 72 and 70', 72', all of the relays being shown in their de-energized position. Switch arms 70 and 70' of relays 54 and 54' are operated by their coils 66 and 66' between fixed contacts 74, 76 and 74', 76', respectively. Switch arms 72 and 72' are operated by their coils 68 and 68' between contacts 78, 80 and 78', 80', respectively. One end of the transformer secondary winding 60 of chopper 48 is connected over conductor 82 to contact 74 and 78 of relays 54 and 56, and its other end connected over conductor 84 to contacts 76 and 80. Secondary winding 60' of the chopper 48' is connected at one end by conductor 82' to contact 74' of relay 54' while the other end of this transformer secondary winding is connected by conductor 84' to contact 76' of relay 54'.

In order to reverse the phase of the current supplied to the contacts of relay 56' to provide unbalance angle readings as brought out in the above mentioned application, contact 74' of relay 54' may be connected over conductor 86 to the oppositely positioned contact 80' of relay 56', and contact 76' may be connected over conductor 88' to contact 78'. Switch arms 70 and 70' of relays 54 and 54' are connected over conductors 90, 90' to a suitable indicator or meter 92 on which is displayed or recorded a quantity related to the total amplitude of unbalance. The meter 92 may be any suitable for of D.C. ammeter such as General Electric microammeter Model 8DB18AI BEIB. Switch arm 72 and 72' of relays 56 and 56' are connected over conductors 94 and 94' to another indicator 96, which can be a zero center indicating meter.

The commutating system of the present invention provides a pair of 90 degree, time-displaced square waves synchronized with the rotation of the workpiece for application to the relay coils 66, 68 and 66', 68' of the choppers 48, 48' and includes a synchronizing pickup unit 176 and an electronic commutator 178. The synchronizing unit 176, which is illustrated herein as being of the photoelectric variety, is positioned adjacent the surface of the workpiece and includes a light source, which illuminates a single paint spot 180 on the workpiece, and a standard photocell 179 (Fig. 2). The photocell and light source may be housed in the synchronizing pickup unit. The commutating signal will thus provide a pair of reference signals bearing some known relation to the angular position of a fixed point on the workpiece such as the bright spot.

The electronic commutator 178 is shown schematically in Fig. 2 together with the wave shapes indicated by the curves 2A through 2S of the voltages obtained at various points therein. The commutator comprises a number of electronic vacuum tube circuits including a biased linear amplifier V1 followed by an unbiased limiting amplifier V2, a saw-tooth generator V3, linear amplifier V4, a symmetrical limiter or double clipper V5, linear amplifier V6, a second symmetrical limiter or double clipper stage V7, a linear amplifier V8 and a power amplifier V9. A branch connection between stages V8 and V9 leads to a linear amplifier V10 which is followed by a symmetrical limiter or double clipper V11, linear amplifier V12, another double clipper V13, linear amplifier V14 and power amplifier V15, the stages V11 through V15 in the lower branch circuit being the same as stages V5 through V9.

The photocell 179 is shown connected between conductors 280 and 282 and develops a voltage shown at 2A across resistor 284 connected to ground in the input circuit of V1. V1 may be a triode amplifier which is cathode biased through resistors 288 and 289 to conduct at input voltages in excess of, say 0.5 volt, thereby removing substantially all of the noise content of the raw synchronizing input pulse supplied to the input of the commutator from the synchronizing pickup unit 176 and provides an amplified inverted pulse such as is shown at 2B to the input of amplifier V2. V2 is an unbiased triode amplifier and is severely driven past cutoff by the negative pulse from V1 to provide an inverted, amplified positive pulse of substantially constant height in its output shown at 2C. Resistors 290 and 291 and electrolytic condensers 292 and 293 connected in the plate circuits of V1 and V2 act as additional graded power supply sections that serve to keep the operating voltage supplied to the plates of these tubes substantially constant.

The output of V2 is connected to a differentiating or rate network 294 constituted by condenser 295 and resistor 296 across which is developed a peaked, differentiated voltage shown at 2D. The differentiated voltage is applied to the input of the saw-tooth generator stage V3 which may be a conventional thyratron saw-tooth generator circuit similar to that used in sweep circuits for cathode ray oscilloscopes. The cathode of the thyratron has a positive constant biasing voltage applied thereto by the action of resistor 300 and electrolytic condenser 302.

The wave 2E is produced by the combined action of the resistor 301, capacitor 304, and the gas triode V3. Current passing through resistor 301 charges capacitor 304 until the gas triode V3 is rendered conducting by the symmetrical signal from vacuum tube V2. At this time capacitor 304 discharges rapidly through V3. This cycle of events is repeated to provide a symmetrical saw-tooth voltage. In order to obtain an accurate symmetric saw-tooth wave form, conventional good practice is observed in proportioning resistor 301 and capacitor 304. The time constant of resistor 301 and capacitor 304 is selected to be at least 10 times as great as the point of the lowest frequency unbalance signal to be measured. When this accurate saw-tooth wave is successively introduced into vacuum tubes V4 and V5 by the interstage capacitor coupling, there will be voltage excursions of equal amplitude above and below the quiescent level of these stages and there is obtained a pair of evenly spaced, quiescent crossover points separated by 180 degrees over the 360 degree period of the wave. These points will serve to define the 180 degree intervals during which the chopper relay coils 66, 68 and 66', 68' are energized or de-energized to produce their chopping or modulating action.

The output of V3 is supplied to the input of the succeeding linear triode amplifier stage V4, the amplified inverted output of which is shown at 2F and is applied to a conventional double-diode limiter stage V5 biased to, say, +1 volt providing symmetrical positive and negative clipping action. V5 furnishes a voltage, such as that shown at 2G to the linear triode amplifier V6, whose output, shown at 2H, is supplied to a second symmetrical double-diode limiter section V7 for further wave shaping purposes.

The output of V7 is a square wave shown at 2I which is supplied to the triode power amplifier section V9 through the preceding linear voltage amplifier V8 whose output is shown at 2J. Connected in the output circuit of the power amplifier are the relay coils 66 and 68' of the choppers 48 and 48' of Fig. 1 which are periodically energized and de-energized in accordance with the potential of the square wave output of the power amplifier shown at 2K.

In order to derive a second square wave displaced 90 degrees in time from the square wave of 2K for driving the relay coils 66' and 68 of the choppers 48 and 48', the square wave output of V8 is supplied in accordance with the present invention over branch conductor 310 to an integrating network 312 constituted by resistor 313 and condenser 314. This network operates upon the square wave of 2L supplied thereto from a part of the output of the triode amplifier V8 to produce a displaced triangular wave across condenser 314 that is supplied to the input of the linear triode amplifier V10. The integrating network integrates the applied square wave to produce the symmetrical saw-tooth wave of 2M having zero crossover points displaced 90 degrees from the zero crossover points of the square wave of 2L.

From the linear amplifier V10, the amplified output wave of 2N is operated upon successively by the cascaded stages V11, V12, V13, V14 and V15, producing the voltage shapes of Figs. 2O, 2P, 2Q, 2R and 2S, respectively, with the resulting square wave of 2S being displaced 90 degrees in time from the square wave 2K of the upper channel or branch circuit. The output of the power amplifier stage V15 has connected therein the operating coils 66' and 68 of the chopper relays of Fig. 1.

The described apparatus thus enables the production of a pair of 90 degree time quadrature displaced square waves having equal half-periods from a single synchronizing input pulse. While the waves could be derived from a pair of synchronizing pulses derived by the use of two or more reflecting paint spots or the like circumferentially displaced on the surface of the workpiece, the use of one spot to derive a single synchronizing pulse eliminates the possibility of error due to uneven spacing if a plurality of marker spots and synchronizing pickup devices were employed. Inasmuch as no tuned circuits or frequency sensitive elements are employed in the commuator apparatus, the output will accurately follow frequency-wise the input as the speed of the balancer should change or vary and the apparatus will have a good low frequency response characteristic for the low frequency synchronizing input pulses supplied thereto.

In order to utilize the present device for making an unbalance determination, the workpiece is placed in position on the bearings 18 and 18' and the motor 26 energized. The belt drive 28 will then rotate the workpiece 24 at the required speed for making the unbalance measurements.

As the bright spot 180 on workpiece 24 moves past the photocell 176, the electronic commutator 178 will produce a pair of 180° square waves which are 90° out of phase with each other and will actuate the various relays in the two chopper circuits 48 and 48'.

The switch 32 is positioned to select pickup 31 or 31' and to transmit the unbalance signal U therefrom to the amplifier 36 which, in turn, feeds the amplified unbalance signal into the resolver 40. The signal is then resolved into two components which are a function of cosine $\phi$ and sine $\phi$. These components are fed respectively to the inputs of amplifiers 44 and 44'. The amplifiers then supply the amplified signals into the primaries 58 and 58' of the two choppers 48 and 48'. As a result the secondary 60 has a component therein which is a function of U cosine $\phi$ and secondary 60' has a component U sin $\phi$ therein, where U is the amount of unbalance and $\phi$ is an arbitrary angle of resolution in resolver 40.

The output 178A of commutator 178 is serially connected to the relay coils 66 and 68' while the output 178B is serially connected to the relay coils 66' and 68. As a result of the square wave energization of these coils for 180° and at 90° phase shift, the component U cosine $\phi$ will be further resolved into signals U cos $\phi$ cos $\theta$ and U cos $\phi$ sin $\theta$ which will appear between the center tap 62 and arms 70 and 72 respectively. The angle $\theta$ is the angle between the bright spot 180 and the point of unbalance. At the same time the component U sin $\phi$ will be resolved into U sin $\phi$ sin $\theta$ and U sin $\phi$ cos $\theta$ which will appear between the center tap 62' and arms 70' and 72' respectively. It can be shown mathematically that if arms 70 and 70' are connected to meter 92 so as to additively combine the two outputs, the meter will indicate the amount of KU (cos $\phi$ cos $\theta$ +sin $\phi$ sin $\theta$) where K is a constant. Thus when angle $\phi$=angle $\theta$, this reduces to KU (cos$^2\theta$+ sin$^2\theta$) and the meter reading will be a function of the amount of unbalance. Similarly it can be shown that, if meter 96 is connected to arms 72 and 72' so as to differentially combine the signals therefrom, the meter 96 will indicate the valve of KU (cos $\phi$ sin $\theta$−sin $\phi$ cos $\theta$). Thus when angle $\phi$=angle $\theta$, this will be equal to zero. Thus when the workpiece is rotating at the correct speed, the operator adjusts knob 330 until meter 96 is nulled. Angle $\phi$ of resolution of resolver 40 will then equal the angle $\theta$ and will indicate the location of unbalance and meter 92 will indicate the amount of unbalance.

What is claimed is:

1. Apparatus for deriving a pair of square waves displaced 90 degrees in time phase apart from a periodically occurring pulse comprising a saw-tooth generating means adapted to receive said pulse and generating a saw-tooth wave output having a repetition rate corresponding to that of said pulse, a first wave shaping means connected to said saw-tooth generating means deriving a first square wave output therefrom, and means deriving a second square wave displaced 90 degrees in time from said first square wave including integrating means connected to receive a part of the square wave output of said first wave shaping means and a second wave shaping means connected to said integrating means.

2. Electronic means for deriving a pair of substantially square wave outputs displaced 90 degrees in time phase apart from a periodically occurring input pulse including a limiter amplifying means connected to receive said input pulse and providing pulses of constant amplitude therefrom, a differentiating network connected to said limiter amplifying means, a saw-tooth generator connected to said differentiating network and wave shaping means including a pair of cascaded symmetrical clipping and amplifier networks connected to said saw-tooth generator and deriving a substantially square wave output therefrom, and means deriving a second substantially square wave output displaced 90 degrees in time from said first mentioned square wave and including integrating means connected to receive a part of the square wave output of said first wave shaping means and a second wave shaping means including a pair of cascaded symmetrical clipping and amplifying networks connected to said integrating means.

3. Electronic means for deriving a pair of substantially square wave outputs displaced 90 degrees in time phase apart from a periodically occurring input pulse, said electronic means comprising a limiter amplifying means connected to receive said input pulse and providing pulses of constant amplitude therefrom; a differentiating network connected to said limiter amplifying means; a saw-tooth generator connected to said network; means for deriving a substantially square wave therefrom including a first symmetrical clipping network, a first linear amplifier having the input thereof interconnected with the output from said clipping network, a second symmetrical clipping network interconnected with said first amplifier and a second linear amplifier connected to said clipping network; and means for deriving a second square wave displaced 90 degrees in time from said first mentioned square wave from a part of the output of said second linear amplifier including an integrating network interconnected with said second linear amplifier, a third symmetrical clipping network interconnected with said last amplifier, a third linear amplifier connected to said last clipping network, a fourth symmetrical clipping network connected to said last amplifier and a fourth linear amplifier connected to said last network.

4. Apparatus for deriving a pair of square waves having a predetermined amount of phase shift therebetween from a periodically occurring pulse, said apparatus comprising a wave generator actuated by said pulse to produce a signal having a predetermined shape and a repetition rate corresponding to that of said pulse, first wave shaping means interconnected with the output of said generator and responsive to said signal for producing a square wave having a frequency identical to said first wave, second wave shaping means for producing a second square wave substantially identical to said first square wave, a reactive circuit interconnecting the output of said generator with the input to said second wave shaping means to provide a signal having said amount of phase shift from the output of the first generator, said second wave shaping means being responsive to said signal to produce a second square wave having a repetition rate corresponding to that of said first wave but being out of phase by said amount.

5. Apparatus for deriving a pair of square waves which are 90 degrees out of phase from each other from a periodically occurring pulse, said apparatus comprising a wave generator actuated by said pulse to produce a signal having a predetermined shape and a repetition rate corresponding to that of said pulse, first wave shaping means interconnected with the output of said generator and responsive to said signal for producing a square wave having a frequency identical to said first wave, second wave shaping means for producing a second square wave substantially identical to said first square wave, an integrating circuit interconnecting the output of said first generator to produce a signal 90 degrees out of phase with said square wave, said integrating circuit being interconnected with the input of said second wave shaping means to actuate said means in response to said signal to produce a second square wave having a repetition rate corresponding to said first wave but being 90 degrees out of phase therewith.

References Cited in the file of this patent

UNITED STATES PATENTS

| | | |
|---|---|---|
| 2,292,100 | Bliss | Aug. 4, 1942 |
| 2,405,430 | Kent | Aug. 6, 1946 |
| 2,451,863 | Oakley | Oct. 19, 1948 |
| 2,730,899 | Heller | Jan. 17, 1956 |
| 2,731,834 | Fehr | Jan. 24, 1956 |
| 2,731,835 | Heller | Jan. 24, 1956 |
| 2,758,204 | Norby | Aug. 7, 1956 |
| 2,783,648 | Stovall et al. | Mar. 5, 1957 |
| 2,787,907 | King | Apr. 9, 1957 |
| 2,835,807 | Lubkin | May 20, 1958 |

OTHER REFERENCES

Pages 371–374, Electronic, by T. B. Brown, published by John Wiley & Sons, 1954.